Sept. 12, 1967 W. R. HIRSHSON 3,341,156
SAFETY CONTROL FOR AIRCRAFT LANDING GEAR
Filed Oct. 23, 1965 2 Sheets-Sheet 1

INVENTOR.
WILLIAM R. HIRSHSON
BY
Davis, Hoxie, Faithfull & Hapgood
ATTORNEYS.

United States Patent Office 3,341,156
Patented Sept. 12, 1967

3,341,156
SAFETY CONTROL FOR AIRCRAFT LANDING
GEAR
William R. Hirshson, 28 Orchard Drive,
New Canaan, Conn. 06840
Filed Oct. 23, 1965, Ser. No. 503,450
11 Claims. (Cl. 244—83)

ABSTRACT OF THE DISCLOSURE

An aircraft safety device interlocking the throttle and the landing gear to prevent the throttle from being adjusted to a landing position when the aircraft landing gear is retracted. The interlocking may result, for example, from the relative designed positions of the landing gear control and the throttle control handles, the relative designed positions of members mounted to the throttle control and landing gear control or operatively associated with said controls, or by the relative designed positions of a member separate from the throttle and landing gear controls and a member mounted to the throttle and landing gear controls. Emergency overriding of said interlock may result from making at least one of said interlocking members yieldable, for example. The interlocking members may also be positioned to prevent the landing gear from being retracted when the throttle is in a landing setting.

---

This invention relates to a safety device associated with an aircraft throttle control and landing gear control, to prevent accidents while landing retractable landing gear aircraft due to pilot error in controlling the landing gear.

Landing gear malfunctions account for the largest percentage of aircraft accidents, the most frequent cause being pilot error in forgetting to extend retractable landing gear into operating position prior to landing. Approximately 10% of all aircraft accidents reported by the Federal Aviation Agency in 1964 involved "gear-up" landings due to the pilot's failure to remember to extend the gear. The second most frequent cause of aircraft accidents due to landing gear malfunctions is again due to pilot error, in landing the aircraft with the landing gear extended but accidentally retracting the gear while the aircraft is in its landing roll along the ground. This latter error generally occurs with the pilot attempting to retract the aircraft flaps and operating the landing gear actuator by mistake.

Both of the above types of landing gear accidents are a cause of concern to the Civil Aeronautics Board and the Federal Aviation Agency, since such accidents result in considerable damage to aircraft engines and airframes as well as injury to passengers. The pilot errors occur with inexperienced as well as experienced aviators, and high insurance rates for retractable gear aircraft reflect the high incidence of these types of accidents.

Various attempts have been made in the past to provide safeguards against the above-described pilot errors, such as by providing mirrors to allow the pilot to see the position of the landing gear, or providing flashing lights or buzzers to indicate the position of the landing gear. The presence and use of mirrors is easily forgotten, however, and flashing lights and buzzers are inadequate since they continue to display an abnormal landing gear condition when said condition becomes normal. A "gear-up" condition is abnormal on landing but normal during flight, and, conversely, a "gear-down" position is abnormal during flight but normal during landing. Those few indicators that respond only to abnormal gear conditions in a given operating situation must somehow be keyed to a functional control which is operated only during that given situation. Thus, one type of abnormal "gear-up" indicator flashes or buzzes when the gear is up and the flaps are fully extended.

At best, however, "abnormal" indicators are a help but sometimes overlooked by a busy pilot during landing procedures.

Automatic systems have also been developed to eliminate one or more of the above pilot errors, one form computing the various factors and conditions involved in the landing of an aircraft and automatically putting the landing gear down at the proper time. The cost of such automatic systems understandably is expensive, however, and materially increases the price of the aircraft.

It is the principal objective of the present invention to overcome the deficiencies and disadvantages of the prior art devices described above and to provide a means for overcoming one or both of the pilot errors described above relating to landing gear accidents.

Another objective of the present invention is to provide a safety control which prevents closing the aircraft engine throttle to a setting appropriate for landing whenever the landing gear has not been extended.

A further objective of the present invention is to provide means for allowing said safety control to be overridden in an emergency to allow the aircraft to land with its landing gear retracted.

An additional objective of the present invention is to provide means whereby said throttle setting appropriate for landing prevents the landing gear from being retracted while the aircraft is in its landing roll along the ground.

A still further objective of the present invention is to provide a said safety control which is inexpensive and easily installed on old as well as new aircraft.

The above objectives are met by the present invention in providing a safety device operatively associated with the aircraft landing gear and throttle and having interlocking means to prevent closure of the engine throttle to a setting appropriate for a landing whenever the landing gear is retracted, thus preventing the landing, but which allows free travel of the throttle when the landing gear is extended. The interlocking means of the safety device may further incorporate a breakaway element which permits the pilot to consciously override the safety function of the throttle safety control interlock during an emergency "gear-up" landing. Although a positive break of the frangible member is desirable in order to clearly indicate to the pilot that he has deliberately circumvented the safety feature, other yieldable means could be employed. For example, an elastomer could be used which upon application of great force yields and afterwards returns to normal. In any event, the pilot must be made aware that he has encountered the interlock so that he will overcome the interlock only with conscious effort. The safety device may still further be so designed so that the throttle in its setting appropriate for landing has means associated therewith to prevent operation of the landing gear to a retracted position.

Other objectives and features of the present invention will be readily appreciated by reference to the following description, when considered in connection with the accompanying drawings wherein.

Figures 1, 2:
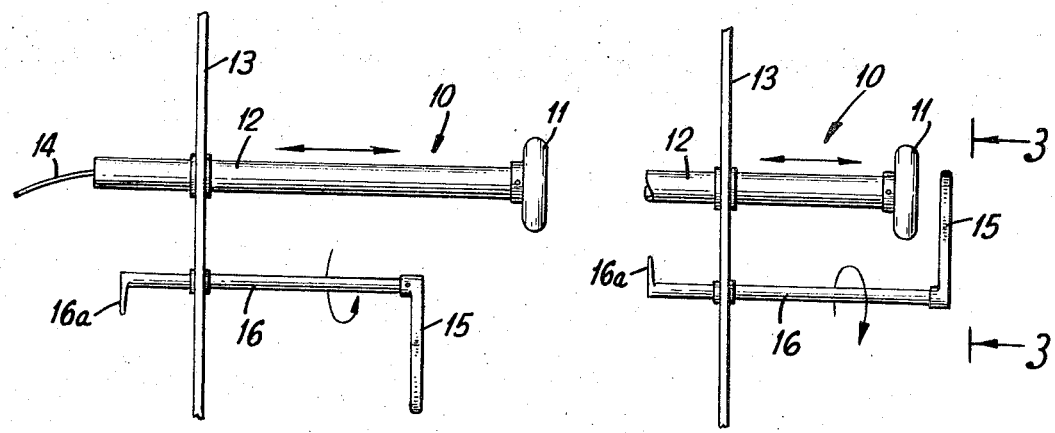
FIGURE 1 is a side elevational view of an embodiment of the present invention, illustrating the relative positioning of the throttle control means and landing gear control means during landing of the aircraft.
FIGURE 2 is a side elevational view of the embodiment of FIGURE 1, illustrating the relative positioning of the throttle control means and landing gear control means during flight of the aircraft.

Referring now to the drawings, there is shown in each a typical aircraft throttle control 10 having a draw handle 11 and a shaft 12. The throttle is mounted on the instrument panel 13, shaft 12 extending therethrough, and cable 14 links the throttle 10 to the engine carburetor. The engine speed is increased as the throttle handle 11 is pushed inwardly toward the instrument panel 13, and decreased as said handle is pulled outwardly away from the panel toward the pilot.

In FIGURE 1, throttle handle 11 is fully withdrawn to the idle, or zero percent, position. Mounted adjacent to the throttle 10 is a landing gear actuator lever 15 which rotates shaft 16 to energize the landing gear system. The landing gear system, not a part of the present invention, may be electrically or hydraulically operated and controlled by buttons or toggles coacting with detent 16a on shaft 16. When lever 15 is in its downward position as shown, detent 16a will operate the landing gear control system to cause the landing gear to be extended. FIGURE 2 illustrates lever 15 pointing upward, and in this position detent 16a will operate the landing gear control system to cause the landing gear to be retracted for flight. In this latter upward position, locking lever 15 interlocks with, and blocks further outward movement away from the instrument panel by lockable throttle handle 11, and the throttle cannot be set to an appropriate position to slow the aircraft engine sufficiently for landing, i.e., to a landing setting at which the aircraft will no longer fly. The distance that landing gear actuator handle 15 extends forward of instrument panel 13 is predetermined so that throttle handle 11 is stopped from rearward motion in the "gear-up" position of said actuator at a position preferably just short of idle. Said distance can of course be made adjustable, and will vary from aircraft to aircraft.

In landing the aircraft, the engine is slowed from its flight speed during the approach to the landing field. The landing gear is then lowered, thereby swinging lever 15 to its downward position and out of the path of the throttle handle 11. On the final approach of the aircraft with the gear lowered, the throttle handle 11 can then be pulled out to the idle position since the landing gear has been extended. On taking off from the field, the throttle handle 11 is pushed inwardly toward panel 13 to gain speed. When the plane is airborne, handle 11 will be between lever 15 and panel 13 so that lever 15 may be swung upwardly into the path of throttle handle 11, thereby retracting the landing gear.

Locking handle 15 may be made with a breakable portion or of a frangible material such as plastic or a ceramic to permit the pilot to forcibly pull out the throttle handle 11 even when lever 15 is in the "gear-up" position of FIGURE 2. This ability to override the safety feature of the invention permits the pilot full control over the engine during an emergency, such as finding it necessary to land on a rough field. In such an instance, it is much safer to land with the landing gear still retracted. The lever 15 must of course be replaced after being overridden and thereby broken.

Figure 3:
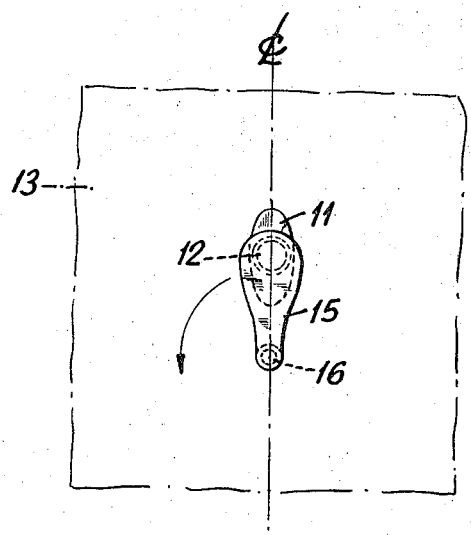
FIGURE 3 is a front elevational view taken along lines 3—3 of FIGURE 2.

FIGURE 3 illustrates actuator lever 15 in its "gear-up" position, and it will be appreciated that the system may be designed so that the landing gear will be retracted only when lever 15 is in an exact upward vertical position with its upper end centered on the axis of throttle shaft 12. With such a design the landing gear control button or toggle will be positioned so that it will not be operated by detent 16a on shaft 16 until lever 15 has been rotated upwardly to the vertical. When the aircraft is then landed by extending the landing gear and withdrawing the throttle handle 11 to idle, the landing gear may not be accidentally retracted during the landing roll of the aircraft since throttle shaft 12 in its idle position prevents actuating lever 15 being moved back completely to the vertical. The upper end of lever 15 may be enlarged as shown in FIGURE 3 to insure this result.

Figure 4:
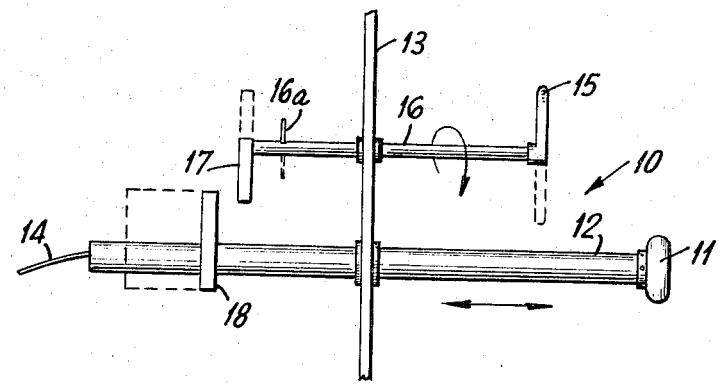
FIGURE 4 is a side elevational view of another embodiment of the present invention, illustrating the relative positionings of the throttle control means and landing gear control means during flight and during landing of the aircraft.

Referring now to the embodiment of FIGURE 4, landing gear actuator lever 15 again rotates shaft 16 to energize the landing gear system. When lever 15 is in its upward position as shown, detent 16a affixed to shaft 16 will coact with the buttons or toggles controlling the landing gear system to cause the landing gear to be retracted. In this position of lever 15, locking member 17 affixed to shaft 16 behind instrument panel 13, and lockable member 18 affixed to shaft 12 also behind the instrument panel 13, will interlock to prevent throttle handle 11 being withdrawn to a setting appropriate to slow the aircraft engine sufficiently for landing. When lever 15 is rotated to its lower position, shown in phantom, detent 16a rotates to cause the landing gear to be extended. Locking member 17 has now rotated to its upper position shown in phantom and members 17 and 18 no longer interlock. Throttle handle 11 may now be withdrawn to a position appropriate to land the aircraft, since the landing gear has been extended.

As in the previous embodiment, the position where throttle handle 11 is interlocked against further rearward motion may be varied, as by adjusting the position of member 17 on shaft 16 or the position of member 18 on shaft 12. Either member 17 or member 18 may also be made with a breakable portion or of a frangible material to allow the pilot to forcibly pull out the throttle handle 11 even when the landing gear is retracted, thereby overriding the interlock and allowing an emergency "gear-up" landing.

The embodiment of the invention shown in FIGURE 4 likewise may be designed so that the landing gear can only be retracted when lever 15 is in an exact upward vertical position and member 17 is in its downward vertical position, in the manner referred to in the previous embodiment. Then, by extending member 18 along shaft 12 as shown in phantom and by making member 18 of sufficient cross-sectional area to interfere with the downward swing of member 17 at landing throttle settings, the landing gear cannot accidentally be retracted while the aircraft is in its landing roll. Lockable member 18 will prevent locking member 17 from being rotated to its vertical downward position, and lever 15 cannot then be rotated to its upward vertical position to allow detent 16a to energize the landing gear control system. When the aircraft takes off, however, throttle handle 11 is pushed inwardly, and when the aircraft is airborne, member 18 will no longer be in a position to interfere with the downward swing of member 17. The landing gear may then be retracted.

Figure 5:
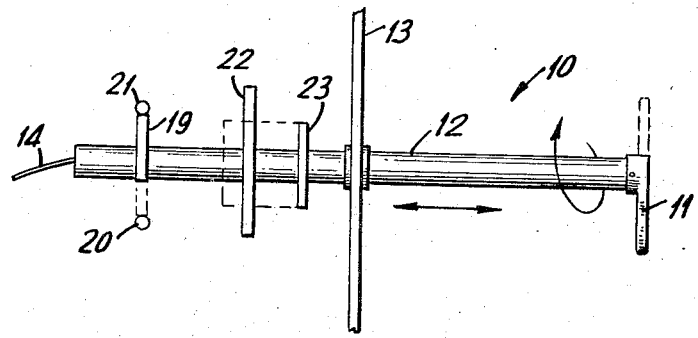
FIGURE 5 is a side elevational view of a still further embodiment of the present invention, illustrating the throttle control means and landing gear control means combined on a single control shaft; and, FIGURE 6 is a side elevational view of an additional embodiment of the present invention, illustrating electrically operated means controlling the throttle according to the landing gear position.

FIGURE 5 illustrates an embodiment of the invention wherein the throttle control and landing gear control are operated by the same handle. Throttle handle 11 again controls the throttle by operation toward or away from instrument panel 13, but additionally operates the landing gear control system by rotation of said handle and shaft 12. Actuator lever 19 is connected to shaft 12 behind the instrument panel 13 so as to rotate with said shaft as handle 11 is rotated, but shaft 12 is splined or grooved to permit it to easily slide through lever 19 without displacing said lever as the throttle is operated. When handle 11 is in its upward position, as shown in phantom, lever 19 will coact with button or toggle 20 controlling the landing gear system to cause the landing gear to be retracted. When handle 11 is in its downward position, lever 19 then coacts with button or toggle 21 to cause the landing gear to be extended. A lockable member 22 mounted adjacent but not connected to shaft 12 is further provided behind the instrument panel, as well as a lockable member 23 affixed to shaft 12. During flight, the throttle handle is moved toward the instrument panel 13, and lockable member 23 is then positioned between lever 19 and locking member 22. The configurations of members 22 and 23 are then so designed that locking member 22 will only allow lockable member 23 on shaft 12 to move past it when the landing gear is extended and handle 11 is in its downward position. In all other positions of handle 11, member 22 will interlock with member 23 and prevent throttle handle 11 being withdrawn to a setting appropriate for landing the aircraft. When handle 11 is rotated to its downward position, members 22 and 23 no longer interlock, the landing gear is extended, and the throttle handle 11 may then be withdrawn to land the aircraft.

Again, as in prior embodiments of the present invention, the interlocked position of shaft 12 may be varied by varying the mounting position of member 22 or by varying the position of member 23 on shaft 12. As in all embodiments of the present invention, the interlocked position of the throttle is designed so that the throttle will have free travel in the range of cruising throttle settings and will only be interlocked from landing throttle settings when the landing gear has not been extended. Either member 22 or member 23 may also be made frangible to allow conscious overriding of the interlock by the pilot to thereby break the frangible member and permit an emergency "gear-up" landing. And, by extending member 23 along shaft 12 as shown in phantom, while maintaining its cross-sectional configuration, handle 11 is prevented from being accidentally rotated to retract the landing gear while the aircraft is in its landing roll. Once the landing gear is extended and the extended member 23 has moved in part past member 22, the designed configuration of members 22 and 23 prevents any further rotation of handle 11. When the aircraft takes off, however, throttle handle 11 is pushed inwardly and member 23 will move competely past member 22 toward lever 19, thereby allowing handle 11 to be rotated to its upward position to retract the landing gear.

Figure 6:
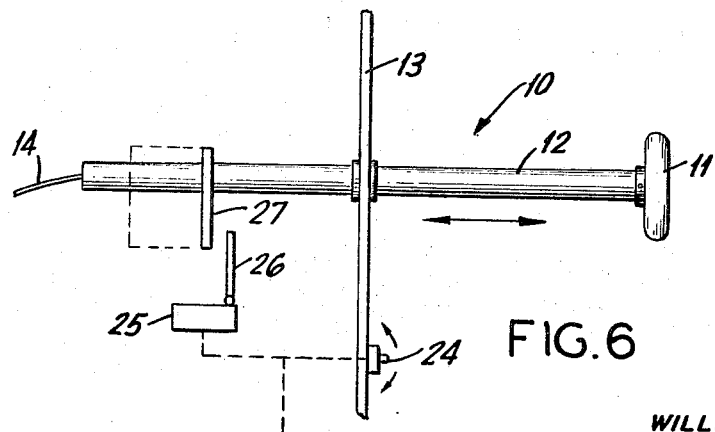

FIGURE 6 illustrates an additional embodiment of the present invention, wherein the landing gear control system is electrically connected to and operated by toggle 24 mounted on instrument panel 13. When toggle 24 is moved to its upward position, the landing gear is retracted, and when toggle 24 is moved to its downward position the landing gear is extended. Toggle 24 is also electrically connected to solenoid 25 mounted behind instrument panel 13, so that locking lever 26, pivotally mounted to and operated by solenoid 25, is moved to a vertical position interfering with lockable member 27 affixed to throttle shaft 12 whenever the landing gear is retracted. During flight of the aircraft, throttle handle 11 is moved inwardly and lever 26 is positioned between member 27 and instrument panel 13. Throttle handle 11 cannot then be withdrawn to a setting appropriate for landing until the landing gear is extended, since members 26 and 27 are otherwise interlocked. When toggle 24 is moved to its downward position to extend the landing gear, however, lever 26 is pivoted out of the path of member 27 to allow full withdrawal of the throttle. Either member 26 or member 27 may again be frangible to permit emergency overriding of the interlock, and the position of member 26 or member 27 may be varied to achieve the desired throttle interlock position.

The embodiment of FIGURE 6 may also be designed to prevent accidental retraction of the landing gear by operating toggle 24 when the aircraft is on the ground in its landing roll. In this instance, it is necessary to design the electrical control system so that the landing gear will only be retracted when toggle 24 is in its upward position and locking lever 26 is also in its upward interlocking position. Thus, by extending member 27 along shaft 12 as shown in phantom and by making member 27 of sufficient cross-sectional area to interfere with the upward swing of lever 26, extended member 27 will prevent lever 26 from returning to the vertical and retracting the landing gear when the aircraft is in its landing roll with the throttle at a landing setting. When the aircraft takes off, however, throttle handle 11 is moved inward and member 27 is moved away from lever 26 to allow the landing gear to be retracted.

The present invention, as disclosed above in several embodiments, may be incorporated into new or used aircraft with a minimal amount of effort and expense, and provides a practically foolproof solution to landing gear accidents caused by pilot error such as previously described.

The present invention is equally applicable to aircraft having one, two or more engines. Where more than one throttle control is involved, an embodiment of the present invention may be installed on each throttle.

It is understood that the above described embodiments are illustrative only and not limiting of the scope of the invention. Many modifications and changes could be made by one skilled in the art without departing from the scope and spirit of the invention as defined in the appended claims.

What is claimed is:

1. A safety device to prevent landing an aircraft with retracted landing gear, comprising in combination a throttle control means, a landing gear control means, a locking means and a lockable means; one of said locking and lockable means being operatively associated with said landing gear control means; one of said locking and lockable means being operatively associated with said throttle control means; and said locking and lockable means being disposed to interlock with each other and interfere with the travel of said throttle control means only when the landing gear is retracted and an attempt is made to close the throttle control means to a landing setting, thereby preventing the throttle control means from being closed to said landing setting.

2. The invention as defined in claim 1, wherein the one of said locking and lockable means operatively associated with said landing gear control means is the same one of said locking and lockable means operatively associated with said throttle control means.

3. The invention as defined in claim 1, wherein said locking and lockable means cooperate with each other to interfere with the retraction operation of said landing gear control means when said throttle control means is in a landing setting.

4. The invention as defined in claim 1, wherein said throttle control means cooperates with said locking means to interfere with the retraction operation of said landing gear control means when said throttle control means is in a landing setting.

5. The invention as defined in claim 1, wherein said locking means is a member affixed to said landing gear control means.

6. The invention as defined in claim 1, wherein said lockable means is a member affixed to said throttle control means.

7. A safety device to prevent landing an aircraft with retracted landing gear, comprising in combination a throttle control means, a landing gear control means, a locking means and a lockable means; one of said locking and lockable means being operatively associated with said landing gear control means; said locking and lockable means being disposed to interlock with each other and interfere with the travel of said throttle control means when the landing gear is retracted, to thereby prevent the throttle control means from being closed to a landing setting; and, means permitting emergency overriding of said interlock by said throttle control means when the landing gear is retracted.

8. The invention as defined in claim 7, wherein said means for permitting emergency overriding of said interlock comprises at least one of said locking and lockable means being frangible.

9. The invention as defined in claim 7, wherein said lockable means is operatively associated with said throttle control means.

10. A safety device to prevent landing an aircraft with retracted landing gear, comprising in combination a throttle control means, a landing gear control means, a locking means comprising the operating handle of said landing gear control means, and a lockable means comprising the operating handle of said throttle control means; and, said locking and lockable means being disposed to interlock with each other and interfere with the travel of said throttle control means when the landing gear is retracted, to thereby prevent the throttle control means from being closed to a landing setting.

11. A safety device to prevent landing an aircraft with retracted landing gear, comprising in combination a throttle control means, a landing gear control means, a locking means comprising a member controlled by a solenoid responsive to the position of said landing gear control means, and a lockable means; and, said locking and lockable means being disposed to interlock with each other and interfere with the travel of said throttle control means when the landing gear is retracted, to thereby prevent the throttle control means from being closed to a landing setting.

References Cited

UNITED STATES PATENTS

| | | | |
|---|---|---|---|
| 2,144,135 | 1/1939 | Zindell | 74—483 |
| 2,417,691 | 3/1947 | Kelly et al. | 244—102 |
| 2,591,602 | 4/1952 | Pilcher | 74—483 |

MILTON BUCHLER, *Primary Examiner.*

ANDREW H. FARRELL, *Assistant Examiner.*